(12) United States Patent
Chang

(10) Patent No.: US 7,203,614 B2
(45) Date of Patent: Apr. 10, 2007

(54) METHOD AND CALIBRATION SYSTEM FOR IQ DC OFFSET AND IMBALANCE CALIBRATION BY UTILIZING ANALYTIC FORMULAS TO QUICKLY DETERMINED DESIRED COMPENSATION VALUES

(75) Inventor: Chia-Yi Chang, I-Lan Hsien (TW)

(73) Assignee: Mediatek Inc., Hsin-Chu Hsien (TW)

( * ) Notice: Subject to any disclaimer, the term of this patent is extended or adjusted under 35 U.S.C. 154(b) by 0 days.

(21) Appl. No.: 11/161,300

(22) Filed: Jul. 29, 2005

(65) Prior Publication Data
US 2007/0027649 A1 Feb. 1, 2007

(51) Int. Cl.
G01R 35/00 (2006.01)
(52) U.S. Cl. ....................................................... 702/106
(58) Field of Classification Search ................. 702/106
See application file for complete search history.

(56) References Cited

U.S. PATENT DOCUMENTS

| | | | |
|---|---|---|---|
| 4,717,894 A | 1/1988 | Edwards et al. | |
| 6,058,291 A | 5/2000 | Ketcham | |
| 6,704,551 B2 * | 3/2004 | Riou et al. | 455/115.1 |
| 2003/0095607 A1 * | 5/2003 | Huang et al. | 375/296 |
| 2004/0150541 A1 * | 8/2004 | Itoh | 341/118 |

* cited by examiner

Primary Examiner—John Barlow
Assistant Examiner—Demetrius Pretlow
(74) Attorney, Agent, or Firm—Winston Hsu

(57) ABSTRACT

A method for determining a target in-phase DC offset compensation value and a target quadrature-phase DC offset compensation value used for compensating DC offset of a database. The method includes: inputting a reference signal into a database which stores a plurality of compensation sets, each having an in-phase DC offset compensation value and a quadrature-phase DC offset compensation value to obtain a plurality of origin offset suppression (OOS) values corresponding to the compensation sets, respectively; and utilizing the compensation sets and the OOS values to compute the target in-phase DC offset compensation value and the target quadrature-phase DC offset compensation value according to an equation set.

31 Claims, 2 Drawing Sheets

METHOD AND CALIBRATION SYSTEM FOR IQ DC OFFSET AND IMBALANCE CALIBRATION BY UTILIZING ANALYTIC FORMULAS TO QUICKLY DETERMINED DESIRED COMPENSATION VALUES

BACKGROUND

The present invention relates to a communication system, and more particularly, to a method and calibration system of IQ DC offset and imbalance calibration for a communication system by utilizing analytic formulas.

In conventional radio frequency circuits, some non-ideal effects of the transmission signal are induced by a mismatch of the circuit elements. Please refer to FIG. 1. FIG. 1 is a diagram of a conventional receiver 100. The receiver 100 comprises an antenna 110, a low noise amplifier (LNA) 120, two mixers 130 and 140, two low pass filters (LPFs) 150 and 160, and two analog-to-digital converters (ADCs) 170 and 180. The antenna 110 receives a radio frequency (RF) signal, and the LNA 120 amplifies the RF signal. The mixer 130 generates an analog signal $S_{a1}$ by mixing the RF signal and a first carrier $COS\omega_c t$ while the other mixer 140 generates an analog signal $S_{a2}$ by mixing the RF signal and a second carrier $SIN(\omega_c t+\psi)$. The LPFs 150 and 160 remove the high-frequency components of the incoming analog signals $S_{a1}$ and $S_{a2}$. Additionally, the ADCs 170 and 180 respectively convert the analog signals $S_{a1}$ and $S_{a2}$ into the corresponding digital signals $S_{d1}$ and $S_{d2}$ for subsequent signal processing.

The phase difference between the ideal first carrier $COS\omega_c t$ and the ideal second carrier $SIN(\omega_c t)$ is 90°. Given an ideal phase difference, the analog signals $S_{a1}$ and $S_{a2}$ are orthogonal. The analog signals $S_{a1}$ and $S_{a2}$ are commonly called In-phase signal and Quadrature-phase signal, respectively. However, due to the drift of temperature, process variation, and other factors, the phase difference between the actual first carrier and the actual second carrier may not be exactly 90°. A phase offset $\psi$ between the first carrier $COS\omega_c t$ and the second carrier $SIN(\omega_c t+\psi)$ indicates this possible effect. The phase offset $\psi$ between two carriers may cause the in-phase signal $S_{a1}$ and the quadrature-phase signal $S_{a2}$ to be non-orthogonal. The case of this non-orthogonal relationship is called IQ mismatch. Generally speaking, the IQ mismatch includes two components: gain mismatch and phase mismatch. The phenomena of IQ mismatch may degrade the performance of the bit error rate (BER) of the communication system. Thus, it is necessary to calibrate IQ mismatch to improve the performance of the communication system and to increase the bit rate of the communication system.

In addition, the receiver 100 may have carrier leakage problem. Carrier leakage occurs when the input is connected to ground, but the mixers 130, 140 still produce output signals. Carrier leakage is usually present at the output of the mixers 130, 140. Non-zero voltage of the mixers 130, 140, the coupled signal coming from a local oscillator, and the mismatch of mixers 130, 140, all may cause the problem of carrier leakage.

In the related art, additional compensation circuits are implemented to compensate for the non-ideal phenomena in the baseband circuit. For instance, the related compensation scheme repeatedly calibrates the compensation values utilized by the compensation circuits, and then measures the results to determine the best compensation values that are capable of minimizing the effects attributed to IQ mismatch. The related art scheme is called a binary search method. The desired compensation time is related to the range of available compensation values and accuracy. However, significant time is required to seek and find the optimum compensation values by this related art scheme. Therefore, the related art scheme is not applicable to being utilized in portable communication devices, such as cellular phones.

SUMMARY OF THE INVENTION

It is therefore one of the objectives of the claimed invention to provide a method and calibration system of IQ DC offset and imbalance calibration by utilizing analytic formulas to quickly determine desired compensation values, to solve the above-mentioned problem.

According to an embodiment of the present invention, a method of determining a target in-phase DC offset compensation value and a target quadrature-phase DC offset compensation value used for compensating DC offset is disclosed. The method includes inputting a reference signal into a database which stores a plurality of compensation sets, each having an in-phase DC offset compensation value and a quadrature-phase DC offset compensation value, to obtain a plurality of origin offset suppression (OOS) values corresponding to the compensation sets, respectively, and utilizing the compensation sets and the OOS values to compute the target in-phase DC offset compensation value and the target quadrature-phase DC offset compensation value according to an equation set.

According to an embodiment of the present invention, a method of determining a target gain compensation value and a target phase compensation value used for compensating gain and phase imbalance is disclosed. The method includes inputting a reference signal into a database which stores a plurality of compensation sets, each having a gain compensation value and a phase compensation value, to obtain a plurality of sideband suppression (SBS) values corresponding to the compensation sets, respectively, and utilizing the compensation sets and the SBS values to compute the target gain compensation value and the target phase compensation value according to an equation set.

In addition, according to an embodiment of the present invention, a calibration system of determining a target in-phase DC offset compensation value and a target quadrature-phase DC offset compensation value used for compensating DC offset is disclosed. The calibration system includes a signal generator for generating a reference signal and inputting the reference signal into a database which stores a plurality of compensation sets, each having an in-phase DC offset compensation value and a quadrature-phase DC offset compensation value; a measurement circuit for obtaining a plurality of origin offset suppression (OOS) values corresponding to the compensation sets, respectively; and a computation circuit for utilizing the compensation sets and the OOS values to compute the target in-phase DC offset compensation value and the target quadrature-phase DC offset compensation value according to an equation set.

Furthermore, according to an embodiment of the present invention, a calibration system of determining a target gain compensation value and a target phase compensation value used for compensating gain and phase imbalance is disclosed. The calibration system includes a signal generator for generating a reference signal and inputting the reference signal into a database which stores a plurality of compensation sets, each having a gain compensation value and a phase compensation value; a measurement circuit for obtaining a plurality of sideband suppression (SBS) values corresponding to the compensation sets, respectively; and a computation circuit for utilizing the compensation sets and the SBS values to compute the target gain compensation value and the target phase compensation value according to an equation set.

The present invention makes use of analytic formulas to quickly determine compensation values for IQ DC offset and IQ imbalance. In addition, utilizing the analytic formulas not only reduces system complexity but also lowers power consumption.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
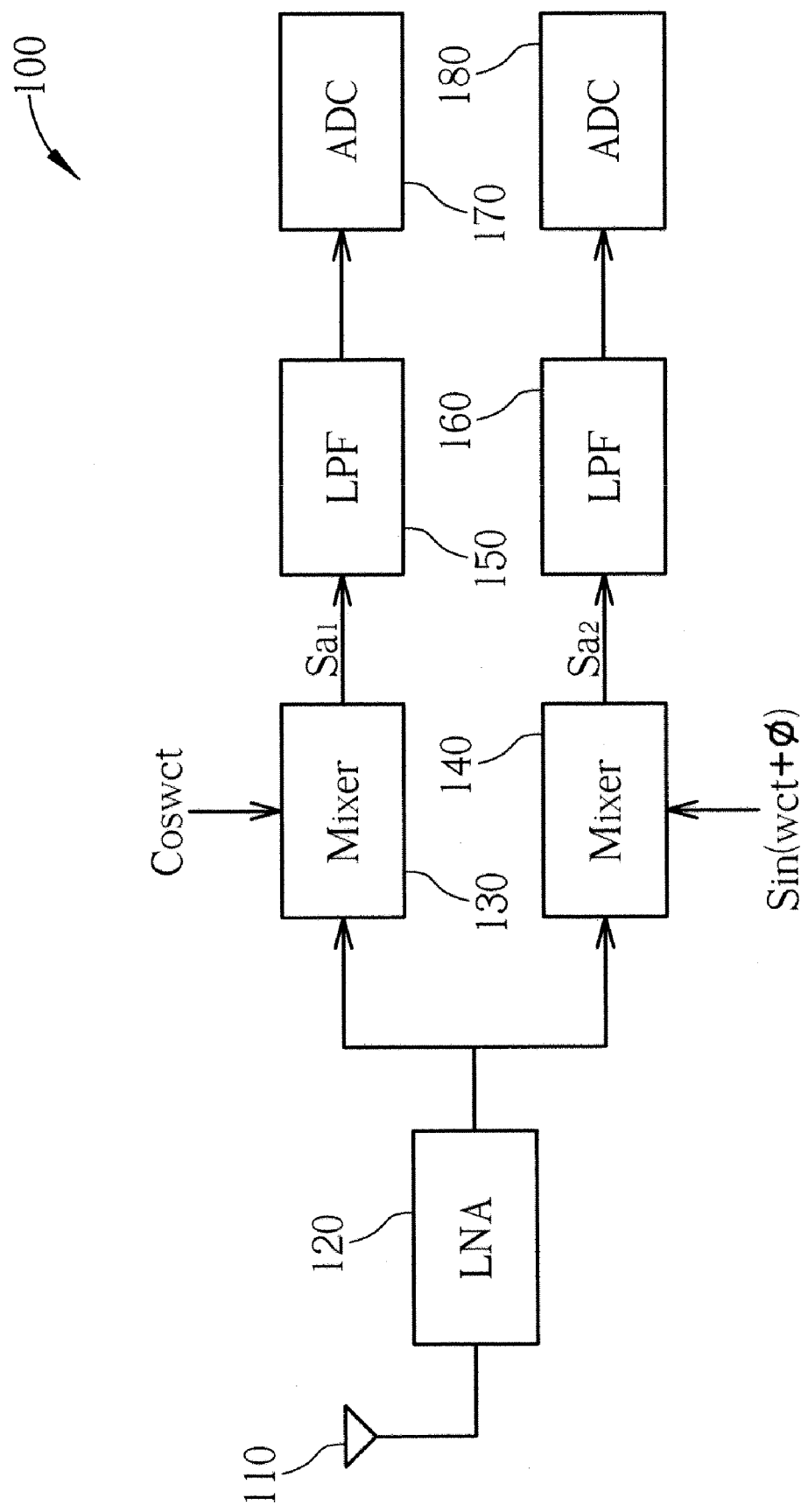
FIG. 1 is a diagram of a conventional receiver.
Figure 2:
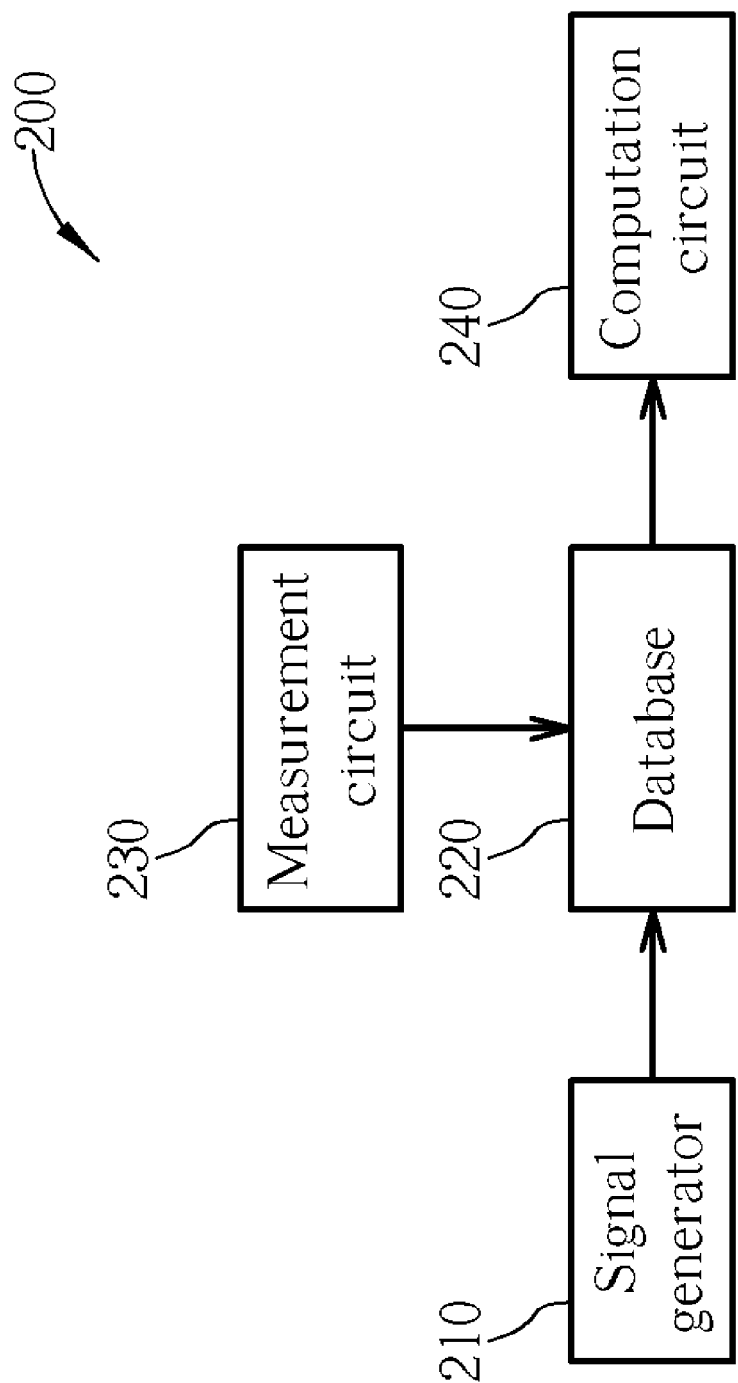
FIG. 2 is a diagram of a calibration system according to an embodiment of the present invention.

Please refer to FIG. 2. FIG. 2 is a diagram of a calibration system 200 applied to a communication apparatus (e.g. a GSM, GPRS, EDGE, WCDMA, CDMA2000, TD-SCDMA, WLAN, WIMAX, Bluetooth communication apparatus) according to an embodiment of the present invention. The calibration system 200 comprises a signal generator 210, a database 220, a measurement circuit 230, and a computation circuit 240. The signal generator 210 generates a reference signal and inputs the reference signal into the database 220. In this embodiment, the signal generator 210, the database 220, the measurement circuit 230, and/or the computation circuit 240 could be located on the database or be an external device connected to the database. The reference signal is a sine wave with a predetermined frequency. For example, it could be a sine wave of frequency 67 kHz. The database 220 stores a plurality of compensation sets, each having an in-phase DC offset compensation value and a quadrature-phase DC offset compensation value. The compensation sets are predetermined according to user's need. For example, the compensation sets can be (0, 0), (0, p), (p, -p), (-p, -p), where p is a positive number. With the compensation sets, the measurement circuit 230 can respectively measure the origin offset suppression (OOS) values corresponding to each compensation set. In this embodiment, the measurement circuit 230 could be an external device connected to the communication device, such as a computer.

With the compensation sets and the OOS values, the computation circuit 240 can then compute the target in-phase DC offset compensation value and the target quadrature-phase DC offset compensation value according to an equation set. In this embodiment, the computation circuit 240 could be located between a RF module and a baseband module of a cellular phone. Or, the computation circuit 240 could be located on a RF module or a baseband module of a cellular phone.

Taking a transmitter calibration for example, assume that a sine wave with amplitude A is inputted to the RF module of the cellular phone, which has equivalent baseband DC offset values of carrier leakage $D_I$ and $D_Q$. Here, $D_I$ is for in-phase path and $D_Q$ is for quadrature-phase path. An output signal RF_TX_Output of the RF circuit can be represented as follows:

$$RF\_TX\_Output = Re\{[A*\exp(j\varphi(t)) + D_I + jD_Q]*\exp(j2\pi f_c t + \theta)\} \quad \text{Eq. (1)}$$

$$= A*\cos(2\pi f_c t + \varphi(t) + \theta) + D_I*\cos(j2\pi f_c t + \theta) -$$

$$D_Q*\sin(j2\pi f_c t + \theta)$$

Then, the expression of origin offset suppression OOS is as follows:

$$OOS = \frac{D_I^2 + D_Q^2}{A^2} \quad \text{Eq. (2)}$$

Assume that $(I_t, Q_t)$ is the optimal (target) IQ DC offset compensation set. In this embodiment, four predetermined compensation sets $(I_1, Q_1)$, $(I_2, Q_2)$, $(I_3, Q_3)$, $(I_4, Q_4)$ are stored in the database 220, and four corresponding origin offset suppression values $OOS_1$, $OOS_2$, $OOS_3$, $OOS_4$ are then calculated by the measurement circuit 230 according to the compensation sets by the following equation Eq. (2). They are then utilized by the computation circuit 240 to obtain the optimal IQ DC offset compensation set $(I_t, Q_t)$ to compensate for the IQ DC offset.

$$[(I_t-I_1)^2+(Q_t-Q_1)^2]*M+$$
$$\Delta=OOS_1*Signal\_Total\_Power \quad \text{Eq. (3)}$$

$$[(I_t-I_2)^2+(Q_t-Q_2)^2]*M+$$
$$\Delta=OOS_2*Signal\_Total\_Power \quad \text{Eq. (4)}$$

$$[(I_t-I_3)^2+(Q_t-Q_3)^2]*M+$$
$$\Delta=OOS_3*Signal\_Total\_Power \quad \text{Eq. (5)}$$

$$[(I_t-I_4)^2+(Q_t-Q_4)^2]*M+$$
$$\Delta=OOS_4*Signal\_Total\_Power \quad (6)$$

In the equations above, M represents for a digital-to-analog conversion ratio, $\Delta$ represents a central frequency noise which is not caused by IQ DC offset.

Based on the equations above: Eq. (3), Eq. (4), Eq. (5), Eq. (6), the target in-phase DC offset compensation value $I_t$ and the target quadrature-phase DC offset compensation value $Q_t$ can be obtained. The results are:

$$I_t = \frac{E*C - B*F}{A*E - D*B} \quad \text{Eq. (7)}$$

$$Q_t = \frac{A*F - D*C}{A*E - D*B}$$

where:

$$A=2*I_1*(OOS_2-OOS_3)+2*I_2*(OOS_3-OOS_1)+2*I_3*(OOS_1-OOS_2) \quad \text{Eq. (9)}$$

$$B=2*Q_1*(OOS_2-OOS_3)+2*Q_2*(OOS_3-OOS_1)+2*Q_3*(OOS_1-OOS_2) \quad \text{Eq. (10)}$$

$$C=(I_1^2+Q_1^2)(OOS_2-OOS_3)+(I_2^2+Q_2^2)(OOS_3-OOS_1)+(I_3^2+Q_3^2)(OOS_1-OOS_2) \quad \text{Eq. (11)}$$

$$D=2*I_1*(OOS_2-OOS_4)+2*I_2*(OOS_4-OOS_1)+2*I_4*(OOS_1-OOS_2) \quad \text{Eq. (12)}$$

$$E=2*Q_1*(OOS_2-OOS_4)+2*Q_2*(OOS_4-OOS_1)+2*Q_4*(OOS_1-OOS_2) \quad \text{Eq. (13)}$$

$$F=(I_1^2+Q_1^2)(OOS_2-OOS_4)+(I_2^2+Q_2^2)(OOS_4-OOS_1)+(I_4^2+Q_4^2)(OOS_1-OOS_2) \quad \text{Eq. (14)}$$

The equations Eq. (7) and Eq. (8) are directly utilized by the computation circuit 240 for computing the target in-phase DC offset compensation value $I_t$ and the target quadrature-phase DC offset compensation value $Q_t$. In other words, the equation set, in this embodiment, is equations Eq. (7) and Eq. (8).

As mentioned above, the calibration system 200 of the present invention can easily determine the target in-phase DC offset compensation value $I_t$ and the target quadrature-phase DC offset compensation value $Q_t$ by just four compensation sets $(I_1, Q_1), (I_2, Q_2), (I_3, Q_3)$ and $(I_4, Q_4)$ and four OOS values $OOS_1, OOS_2, OOS_3, OOS_4$. Therefore, the required calibration time of the present invention can be greatly reduced by utilizing the analytic formulas shown in equations Eq. (7) and Eq. (8).

Furthermore, it should be understood that the number of compensation sets is not a limitation of the invention. In some embodiments, without consideration of the digital-to-analog conversion ratio M or the central frequency noise not caused by IQ DC offset $\Delta$, three compensation sets are good enough for the calibration.

In addition to IQ DC offset calibration, the calibration system 200 can also be used to perform IQ mismatch calibration. Similar to the aforementioned IQ DC offset calibration, the calibration system 200 determines a target gain compensation value and a target phase compensation value by utilizing analytic formulas. In this embodiment, the database 220 sequentially stores a plurality of compensation sets each having a gain compensation value and a phase compensation value to compensate for the gain and phase mismatch of the database. In addition, the measurement circuit 230 is activated to measure a plurality of sideband suppression (SBS) values corresponding to each compensation set. Ultimately, the computation circuit 240 uses the compensation sets and the SBS values to compute the target gain compensation value and the target phase compensation value according to an equation set. Similarly, in this embodiment, the signal generator 210, the database 220, the measurement circuit 230, or the computation circuit 240 can be located on the database or be an external device connected to the database.

Taking a transmitter calibration for example, assume that a sine wave with amplitude A is inputted to the RF module of the cellular phone, which has the gain error and phase error between the mixers denoted by $\epsilon$ and $\theta$, respectively. An output baseband signal BB_TX_Output can be represented as follows:

$$BB\_TX\_Output = A*(1+\varepsilon/2)*[\cos(\theta/2)*\cos(\varphi(t)) + \quad \text{Eq. (15)}$$
$$\sin(\theta/2)*\sin(\varphi(t))] +$$
$$jA*(1-\varepsilon/2)*[\sin(\theta/2)*\cos(\varphi(t)) +$$
$$\cos(\theta/2)*\sin(\varphi(t))]$$
$$= A*[\cos(\theta/2) - j*\varepsilon/2*$$
$$\sin(\theta/2)]*\exp(j\varphi(t)) +$$
$$A*[\varepsilon/2*\cos(\theta/2) + j*\sin(\theta/2)]*\exp(-j\varphi(t))$$

Then, the baseband signal BB_TX_Output is converted into a radio frequency signal RF_TX_Output expressed as follows:

$$RF\_TX\_Output = Re\{BB\_TX\_Output * \exp(j(2\pi f_c t + \theta))\} \quad \text{Eq. (16)}$$
$$= A*\cos(\theta/2)*\cos(j(2\pi f_c t + \varphi(t) + \theta)) +$$
$$A*\varepsilon/2*\sin(\theta/2)*\sin(j(2\pi f_c t + \varphi(t) + \theta)) +$$
$$A*\varepsilon/2*\cos(\theta/2)*\cos(j(2\pi f_c t - \varphi(t) + \theta)) -$$
$$A*\sin(\theta/2)*\sin(j(2\pi f_c t - \varphi(t) + \theta))$$

If the gain error $\epsilon$ and phase error $\theta$ are significantly less than one, the sideband suppression SBS is calculated as:

$$SBS = \quad \text{Eq. (17)}$$
$$\frac{A^2*(\varepsilon/2)^2*\cos^2(\theta/2) + A^2*\sin^2(\theta/2)}{A^2 + A^2(\varepsilon/2)^2} \approx (\varepsilon/2)^2 + (\theta/2)^2$$

Assume that $(\epsilon_t, \theta_t)$ is the optimal (target) IQ gain error and phase error compensation set. In this embodiment, three compensation sets $(\epsilon_1, \theta_1), (\epsilon_2, \theta_2), (\epsilon_3, \theta_3)$ are predetermined, and then three corresponding sideband suppression values $SBS_1, SBS_2, SBS_3$ are obtained through the measurement circuit 230 according to Eq. (17).

$$[(\epsilon_t - \epsilon_1)^2/4 + (\theta_t - \theta_1)^2/4]*Signal\_Total\_Power + \quad \text{Eq. (18)}$$
$$\sigma = SBS_1 * Signal\_Total\_Power$$

$$[(\epsilon_t - \epsilon_2)^2/4 + (\theta_t - \theta_2)^2/4]*Signal\_Total\_Power + \quad \text{Eq. (19)}$$
$$\sigma = SBS_2 * Signal\_Total\_Power$$

$$[(\epsilon_t - \epsilon_3)^2/4 + (\theta_t - \theta_3)^2/4]*Signal\_Total\_Power + \quad \text{Eq. (20)}$$
$$\sigma = SBS_3 * Signal\_Total\_Power$$

In the equations above, $\sigma$ represents the sideband frequency noise which is not caused by IQ mismatch.

As mentioned above, the predetermined compensation sets include $(\epsilon_1, \theta_1), (\epsilon_2, \theta_2)$, and $(\epsilon_3, \theta_3)$, and the measured SBS values corresponding to the compensation sets are $SBS_1, SBS_2, SBS_3$, respectively. Based on the above equations Eq. (18), Eq. (19), Eq. (20), the target gain compensation value $\epsilon_t$, and the target phase compensation value $\theta_t$ can be obtained. The results are:

$$\varepsilon_t = \frac{(\varepsilon_1^2 + \theta_1^2 - 4*SBS_1)(\theta_2 - \theta_3) +}{\varepsilon_1(\theta_2 - \theta_3) + \varepsilon_2(\theta_3 - \theta_1) + \varepsilon_3(\theta_1 - \theta_2)} \quad \text{Eq. (21)}$$
$$\frac{(\varepsilon_2^2 + \theta_2^2 - 4*SBS_2)(\theta_3 - \theta_1) +}{}$$
$$\frac{(\varepsilon_3^2 + \theta_3^2 - 4*SBS_3)(\theta_1 - \theta_2)}{}$$

$$\theta_t = \frac{(\varepsilon_1^2 + \theta_1^2 - 4*SBS_1)(\varepsilon_2 - \varepsilon_3) +}{\theta_1(\varepsilon_2 - \varepsilon_3) + \theta_2(\varepsilon_3 - \varepsilon_1) + \theta_3(\varepsilon_1 - \varepsilon_2)} \quad \text{Eq. (22)}$$
$$\frac{(\varepsilon_2^2 + \theta_2^2 - 4*SBS_2)(\varepsilon_3 - \varepsilon_1) +}{}$$
$$\frac{(\varepsilon_3^2 + \theta_3^2 - 4*SBS_3)(\varepsilon_1 - \varepsilon_2)}{}$$

Therefore, the equations Eq. (21) and Eq. (22) can be utilized by the computation circuit 240 for computing the target gain compensation value $\epsilon_t$ and the target phase compensation value $\theta_t$. In other words, the equation set, in this embodiment, are equations Eq. (21) and Eq. (22).

As mentioned above, the calibration system 200 of the present invention can easily determine the target gain compensation value $\epsilon_t$ and the target phase compensation value $\theta_t$ by only three compensation sets $(\epsilon_1, \theta_1), (\epsilon_2, \theta_2)$, and $(\epsilon_3, \theta_3)$ and three SBS values $SBS_1, SBS_2$, and $SBS_3$. Therefore, the required calibration time of the present invention can be greatly reduced by utilizing the analytic formulas, i.e. the equations Eq. (21) and Eq. (22).

It should be noted that the OOS values and the SBS values can be simultaneously or individually measured by the measurement circuit 230, and the IQ DC offset calibration and the IQ mismatch calibration can be performed simultaneously by the computation circuit 240.

In addition to the transmitter, as is known to those skilled in this art, the IQ mismatch and the IQ DC offset may also affect the receiver or the transceiver. The above embodiments disclose calibrating IQ mismatch and the IQ DC offset of a transmitter. However, the calibration scheme of the present invention is not limited to calibrating the transmitter. That is, the aforementioned calibration can be applied to the receiver or the transceiver. In some embodiment, the calibration system can be implemented on a baseband module or a RF module of a cellular phone. The same objective of quickly calibrating the IQ mismatch and the IQ DC offset is achieved.

In contrast to the related art binary search scheme, the present invention makes use of analytic formulas to quickly determine compensation values for IQ DC offset and IQ imbalance. In addition, utilizing the analytic formulas not only reduces system complexity but also lowers power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for determining a target in-phase DC offset compensation value and a target quadrature-phase DC offset compensation value utilized for compensating DC offset of a communication system, the method comprising:

inputting a reference signal into a database, wherein the database stores a plurality of compensation sets, each having an in-phase DC offset compensation value and a quadrature-phase DC offset compensation value, to obtain a plurality of origin offset suppression (OOS) values corresponding to the compensation sets, respectively;

utilizing the compensation sets and the OOS values to compute the target in-phase DC offset compensation value and the target quadrature-phase DC offset compensation value according to an equation set; and calibrating the communication system utilizing the target in-phase DC offset compensation value and the target quadrature-phase DC offset compensation value to compensate for the DC offset.

2. The method of claim 1, wherein the reference signal is a sine-wave signal.

3. The method of claim 1, wherein the number of the compensation sets is 4.

4. The method of claim 1, wherein the reference signal is a sine wave with amplitude A and the compensation sets are $(I_1, Q_1)$, $(I_2, Q_2)$, $(I_3, Q_3)$ and $(I_4, Q_4)$, $I_1$, $I_2$, $I_3$, and $I_4$ being in-phase DC offset compensation values, and $Q_1$, $Q_2$, $Q_3$, and $Q_4$ being quadrature in-phase DC offset compensation values, and the method further comprises:

calculating the OOS values $OOS_1$, $OOS_2$, $OOS_3$, $OOS_4$ respectively corresponding to each of the compensation sets according to the following equations:

$$OOS_1 = \frac{I_1^2 + D_1^2}{A^2},\ OOS_2 = \frac{I_2^2 + D_2^2}{A^2},\ OOS_3 = \frac{I_3^2 + D_3^2}{A^2},$$

and $$OOS_4 = \frac{I_4^2 + D_4^2}{A^2};$$

wherein $D_1$, $D_2$, $D_3$, and $D_4$ are baseband DC offset values of carrier leakage.

5. The method of claim 1, wherein the compensation sets include (I1, Q1), (I2, Q2), (I3, Q3) and (I4, Q4), I1, I2, I3, and I4 being in-phase DC offset compensation values, and Q1, Q2, Q3, and Q4 being quadrature in-phase DC offset compensation values, the OOS values corresponding to the compensation sets are OOS1, OOS2, OOS3, OOS4, respectively, and the equation set for computing the target in-phase DC offset compensation value It and the target quadrature-phase DC offset compensation value Qt are:

$$I_t = \frac{E*C - B*F}{A*E - D*B}$$

$$Q_t = \frac{A*F - D*C}{A*E - D*B}$$

where
A=2*I1*(OOS2−OOS3)+2*I2*(OOS3−OOS1)+2*I3*(OOS1−OOS2);
B=2*Q1*(OOS2−OOS3)+2*Q2*(OOS3−OOS1)+2*Q3*(OOS1−OOS2);
C=(I12+Q12)(OOS2−OOS3)+(I22+Q22)(OOS3−OOS1)+(I32+Q32)(OOS1−OOS2);
D=2*I1*(OOS2−OOS4)+2*I2*(OOS4−OOS1)+2*I4*(OOS1−OOS2);
E=2*Q1*(OOS2−OOS4)+2*Q2*(OOS4−OOS1)+2*Q4*(OOS1−OOS2); and
F=(I12+Q12)(OOS2−OOS4)+(I22+Q22)(OOS4−OOS1)+(I42+Q42)(OOS1−OOS2).

6. The method of claim 1 being applied to a Global System for Mobile Communication (GSM), General Packet Radio Service (GPRS), or Enhanced GPRS (EGPRS) communication system.

7. A method for determining a target gain compensation value and a target phase compensation value for compensating gain and phase imbalance of a communication system, the method comprising:

inputting a reference signal into a database, wherein the database stores a plurality of compensation sets, each having a gain compensation value and a phase compensation value, to obtain a plurality of sideband suppression (SBS) values corresponding to the compensation sets, respectively;

utilizing the compensation sets and the SBS values to compute the target gain compensation value and the target phase compensation value according to an equation set; and calibrating the communication system utilizing the target gain compensation value and the target phase compensation value to compensate for the gain and phase imbalance.

8. The method of claim 7, wherein the reference signal is a sine-wave signal.

9. The method of claim 7, wherein the number of the compensation sets is3.

10. The method of claim 7, wherein the reference signal is a sine wave with amplitude A and the compensation sets are $(\epsilon_1,\theta_1)$, $(\epsilon_2,\theta_2)$, and $(\epsilon_3,\theta_3)$, $\epsilon_1$, $\epsilon_2$, and $\epsilon_3$ being gain compensation values and $\theta_1$, $\theta_2$, $\theta_3$ being phase compensation values, and the method further comprises:

calculating the SBS values $SBS_1$, $SBS_2$, $SBS_3$ respectively corresponding to each of the compensation sets according to the following equations:

$$SBS_1=(\epsilon_1/2)^2+(\theta_1/2)^2,\ SBS_2=(\epsilon_2/2)^2+(\theta_2/2)^2,\ \text{and}\ SBS_3=(\epsilon_3/2)^2=(\theta_3/2)^2.$$

11. The method of claim 7, wherein the compensation sets include $(\epsilon_1, \theta_1)$, $(\epsilon_2, \theta_2)$, and $(\epsilon_3, \theta_3)$, $\epsilon_1$ $\epsilon_2$ and $\epsilon 3$ being gain compensation values, and $\theta_1$, $\theta_2$, $\theta_3$ being phase compensation values, the SBS values corresponding to the compensation sets are $SBS_1$, $SBS_2$, $SBS_3$, respectively, and the equation set for computing the target gain compensation value $\epsilon_t$ and the target phase compensation value $\theta_t$ are:

$$\epsilon_t = \frac{(\epsilon_1^2+\theta_1^2-4*SBS_1)(\theta_2-\theta_3)+(\epsilon_2^2+\theta_2^2-4*SBS_2)(\theta_3-\theta_1)+(\epsilon_3^2+\theta_3^2-4*SBS_3)(\theta_1-\theta_2)}{\epsilon_1(\theta_2-\theta_3)+\epsilon_2(\theta_3-\theta_1)+\epsilon_3(\theta_1-\theta_2)}$$

$$\theta_t = \frac{(\epsilon_1^2+\theta_1^2-4*SBS_1)(\epsilon_2-\epsilon_3)+(\epsilon_2^2+\theta_2^2-4*SBS_2)(\epsilon_3-\epsilon_1)+(\epsilon_3^2+\theta_3^2-4*SBS_3)(\epsilon_1-\epsilon_2)}{\theta_1(\epsilon_2-\epsilon_3)+\theta_2(\epsilon_3-\epsilon_1)+\theta_3(\epsilon_1-\epsilon_2)}.$$

12. The method of claim 7 being applied to a Global System for Mobile Communication (GSM), General Packet Radio Service (GPRS), or Enhanced GPRS (EGPRS) communication system.

13. A calibration system for determining a target in-phase DC offset compensation value and a target quadrature-phase DC offset compensation value utilized for compensating DC offset, the calibration system comprising:

a signal generator for generating a reference signal and inputting the reference signal into a database, wherein the database stores a plurality of compensation sets, each having an in-phase DC offset compensation value and a quadrature-phase DC offset compensation value;

a measurement circuit for obtaining a plurality of origin offset suppression (OOS) values corresponding to the compensation sets, respectively; and a computation circuit for utilizing the compensation sets and the OOS values to compute the target in-phase DC offset compensation value and the target quadrature-phase DC offset compensation value according to an equation set.

14. The calibration system of claim 13, wherein the calibration system is located on the mobile device.

15. The calibration system of claim 14, wherein the mobile device has a RF module and a baseband module, the calibration system is located between the RF module and the baseband module.

16. The calibration system of claim 14, wherein the mobile device has a RF module and a baseband module, the calibration system is located on the RF module or the baseband module.

17. The calibration system of claim 13, wherein the reference signal is a sine-wave signal.

18. The calibration system of claim 13, wherein the number of the compensation sets is 4.

19. The calibration system of claim 13, wherein the reference signal is a sine wave with amplitude A and the compensation sets are $(I_1, Q_1)$, $(I_2, Q_2)$, $(I_3, Q_3)$ and $(I_4, Q_4)$, $I_1$, $I_2$, $I_3$, and $I_4$ being in-phase DC offset compensation values, and $Q_1$, $Q_2$, $Q_3$, and $Q_4$ being quadrature in-phase DC offset compensation values, and the measurement circuit further calculates the OOS values $OOS_1$, $OOS_2$, $OOS_3$, $OOS_4$ respectively corresponding to each of the compensation sets according to the following equations:

$$OOS_1 = \frac{I_1^2+D_1^2}{A^2},\ OOS_2 = \frac{I_2^2+D_2^2}{A^2},$$

$$OOS_3 = \frac{I_3^2+D_3^2}{A^2},\ \text{and}\ OOS_4 = \frac{I_4^2+D_4^2}{A^2};$$

wherein $D_1$, $D_2$, $D_3$, and $D_4$ are baseband DC offset values of carrier leakage.

20. The calibration system of claim 13, wherein the compensation sets include $(I_1, Q_1)$, $(I_2, Q_2)$, $(I_3, Q_3)$ and $(I_4, Q_4)$, $I_1$, $I_2$, $I_3$, and $I_4$ being in-phase DC offset compensation values, and $Q_1$, $Q_2$, $Q_3$, and $Q_4$ being quadrature in-phase DC offset compensation values, the OOS values corresponding to the compensation sets are $OOS_1$, $OOS_2$, $OOS_3 1$ $OOS_4$, respectively, and the equation set for computing the target in-phase DC offset compensation value $I_t$ and the target quadrature-phase DC offset compensation value $Q_t$ are:

$$I_t = \frac{E*C-B*F}{A*E-D*B}$$

$$Q_t = \frac{A*F-D*C}{A*E-D*B}$$

where
$A=2*I_1*(OOS_2-OOS_3)+2*I_2*(OOS_3-OOS_1)+2*I_3*(OOS_1-OOS_2)$;
$B=2*Q_1*(OOS_2-OOS_3)+2*Q_2*(OOS_3-OOS_1)+2*Q_3*(OOS_1-OOS_2)$;
$C=(I_1^2+Q_1^2)(OOS_2-OOS_3)+(I_2^2+Q_2^2)(OOS_3-OOS_1)+(I_3^2+Q_3^2)(OOS_1-OOS_2)$;
$D=2*I_1*(OOS_2-OOS_4)+2*I_2*(OOS_4-OOS_1)+2*I_4*(OOS_1-OOS_2)$;
$E=2*Q_1*(OOS_2-OOS4)+2*Q_2*(OOS_4-OOS_1)+2*Q_4*(OOS_1-OOS_2)$; and
$F=(I_1^2+Q_1^2)(OOS_2-OOS_4)+(I_2^2+Q_2^2)(OOS_4-OOS_1)+(I_4^2+Q_4^2)(OOS_1-OOS_2)$.

21. The calibration system of claim 13 being applied to a Global System for Mobile Communication (GSM), General Packet Radio Service (GPRS), or Enhanced GPRS (EGPRS) communication system.

22. A calibration system for determining a target gain compensation value and a target phase compensation value utilized for compensating gain and phase imbalance, the calibration system comprising:

a signal generator for generating a reference signal and inputting the reference signal into a database, wherein the database stores a plurality of compensation sets, each having a gain compensation value and a phase compensation value;

a measurement circuit for obtaining a plurality of sideband suppression (SBS) values corresponding to the compensation sets, respectively; and a computation circuit for utilizing the compensation sets and the SBS values to compute the target gain compensation value and the target phase compensation value according to an equation set.

23. The calibration system of claim 20, wherein the calibration system is located on a mobile device.

24. The calibration system of claim 23, wherein the mobile device has a RF module and a baseband module, the calibration system is located between the RF module and the baseband module.

25. The calibration system of claim 23, wherein the mobile device has a RF module and a baseband module, the calibration system is located on the RF module or the baseband module.

26. The calibration system of claim 23, wherein the reference signal is a sine-wave signal.

27. The calibration system of claim 23, wherein the number of the compensation sets is 3.

28. The calibration system of claim 23, wherein the reference signal is a sine wave with amplitude A and the compensation sets are $(\epsilon_1,\theta_1)$, $(\epsilon_2,\theta_2)$, and $(\epsilon_3,\theta_3)$, $\epsilon_1$, $\epsilon_2$, $\epsilon_3$ being gain compensation values, and $\theta_1$, $\theta_2$, $\theta_3$ being phase compensation values, and the measurement circuit further calculates the SBS values $SBS_1$, $SBS_2$, $SBS_3$ respectively corresponding to each of the compensation sets according to the following equations:

$$SBS_1=(\epsilon_1/2)^2+(\theta_1/2)^2, SBS_2=(\epsilon_2/2)^2+(\theta_2/2), \text{ and } SBS_3=(\epsilon_3/2)^2+(\theta_3/2)^2.$$

29. The calibration system of claim 23, wherein the compensation sets include $(\epsilon_1, \theta_1)$, $(\epsilon_2, \theta_2)$, and $(\epsilon_3, \theta_3)$, $\epsilon_1$, $\epsilon_2$ and $\epsilon_3$ being gain compensation values, and $\theta_1$, $\theta_2$, $\theta_3$ being phase compensation values, the SBS values corresponding to the compensation sets are $SBS_1$, $SBS_2$, $SBS_3$, respectively, and the equation set for computing the target gain compensation value $\epsilon_t$ and the target phase compensation value $\theta_t$ are:

$$\varepsilon_t = \frac{\begin{array}{l}(\varepsilon_1^2 + \theta_1^2 - 4*SBS_1)(\theta_2 - \theta_3) + \\ (\varepsilon_2^2 + \theta_2^2 - 4*SBS_2)(\theta_3 - \theta_1) + \\ (\varepsilon_3^2 + \theta_3^2 - 4*SBS_3)(\theta_1 - \theta_2)\end{array}}{\varepsilon_1(\theta_2 - \theta_3) + \varepsilon_2(\theta_3 - \theta_1) + \varepsilon_3(\theta_1 - \theta_2)}$$

$$\theta_t = \frac{\begin{array}{l}(\varepsilon_1^2 + \theta_1^2 - 4*SBS_1)(\varepsilon_2 - \varepsilon_3) + \\ (\varepsilon_2^2 + \theta_2^2 - 4*SBS_2)(\varepsilon_3 - \varepsilon_1) + \\ (\varepsilon_3^2 + \theta_3^2 - 4*SBS_3)(\varepsilon_1 - \varepsilon_2)\end{array}}{\theta_1(\varepsilon_2 - \varepsilon_3) + \theta_2(\varepsilon_3 - \varepsilon_1) + \theta_3(\varepsilon_1 - \varepsilon_2)}$$

30. The calibration system of claim 23 being applied to a Global System for Mobile Communication (GM), General Packet Radio Service (GPRS), or Enhanced GPRS (EGPRS) communication system.

31. A calibration system for determining a target in-phase DC offset compensation value and a target quadrature-phase DC offset compensation value utilized for compensating DC offset, a target gain compensation value and a target phase compensation value utilized for compensating gain and phase imbalance, the calibration system comprising:
  a signal generator for generating a reference signal and inputting the reference signal into a database, wherein the database stores a plurality of first compensation sets, each having an in-phase DC offset compensation value and a quadrature-phase DC offset compensation value, and a plurality of second compensation sets, each having a gain compensation value and a phase compensation value;
  a measurement circuit for obtaining a plurality of origin offset suppression (OOS) values respectively corresponding to the first compensation sets and a plurality of sideband suppression (SBS) values respectively corresponding to the second compensation sets; and
  a computation circuit for utilizing the first compensation sets and the OOS values to compute the target in-phase DC offset compensation value and the target quadrature-phase DC offset compensation value according to an first equation set, and for utilizing the second compensation sets and the SBS values to compute the target gain compensation value and the target phase compensation value according to an second equation set.

* * * * *